United States Patent [19]

Neaves

[11] Patent Number: 4,669,508

[45] Date of Patent: Jun. 2, 1987

[54] FORMABLE AND CURVE SHAPE RETENTIVE HOSE

[75] Inventor: Larry E. Neaves, Jefferson, N.C.

[73] Assignee: The Gates Rubber Company, Denver, Colo.

[21] Appl. No.: 793,074

[22] Filed: Oct. 31, 1985

[51] Int. Cl.$^4$ .............................................. F16L 55/00
[52] U.S. Cl. ................................ 138/121; 138/DIG. 8
[58] Field of Search ........... 138/121, 122, 103, DIG. 8, 138/111, 112; 156/143, 244.13

[56] References Cited

U.S. PATENT DOCUMENTS

| | | |
|---|---|---|
| 314,440 | 3/1885 | Eames . |
| 2,704,556 | 3/1955 | Blish .............................. 138/DIG. 8 |
| 2,998,028 | 7/1958 | Rohde . |
| 3,194,705 | 7/1965 | Caplan . |
| 3,315,703 | 4/1967 | Matthews et al. . |
| 3,859,408 | 1/1975 | Voss et al. . |
| 4,098,298 | 7/1978 | Vohrer .............................. 138/122 |
| 4,295,496 | 10/1981 | Bixby ............................... 138/122 |
| 4,307,754 | 12/1981 | Muratsubaki ...................... 138/121 |
| 4,327,775 | 5/1982 | Jolly . |
| 4,374,530 | 2/1983 | Walling ............................. 138/121 |
| 4,456,034 | 6/1984 | Bixby . |
| 4,463,779 | 8/1984 | Wink et al. . |
| 4,517,404 | 5/1985 | Hughes et al. ..................... 138/111 |
| 4,620,569 | 11/1986 | von Glanstätten et al. ........ 138/121 |

Primary Examiner—Stephen Marcus
Assistant Examiner—Leo J. Peters
Attorney, Agent, or Firm—H. W. Oberg, Jr.; C. H. Castleman, Jr.; F. P. Grassler

[57] ABSTRACT

A reformable, shape retentive hose having a precured tube located in a hose sidewall, and a reformable rod inserted in the precured tube. A method for making hose by placing at least one precured tube in the sidewall of a hose during the time that the hose sidewall is formed, curing the hose assembly with the precured tube in the sidewall, and inserting a reformable rod in a portion of the precured tube.

19 Claims, 12 Drawing Figures

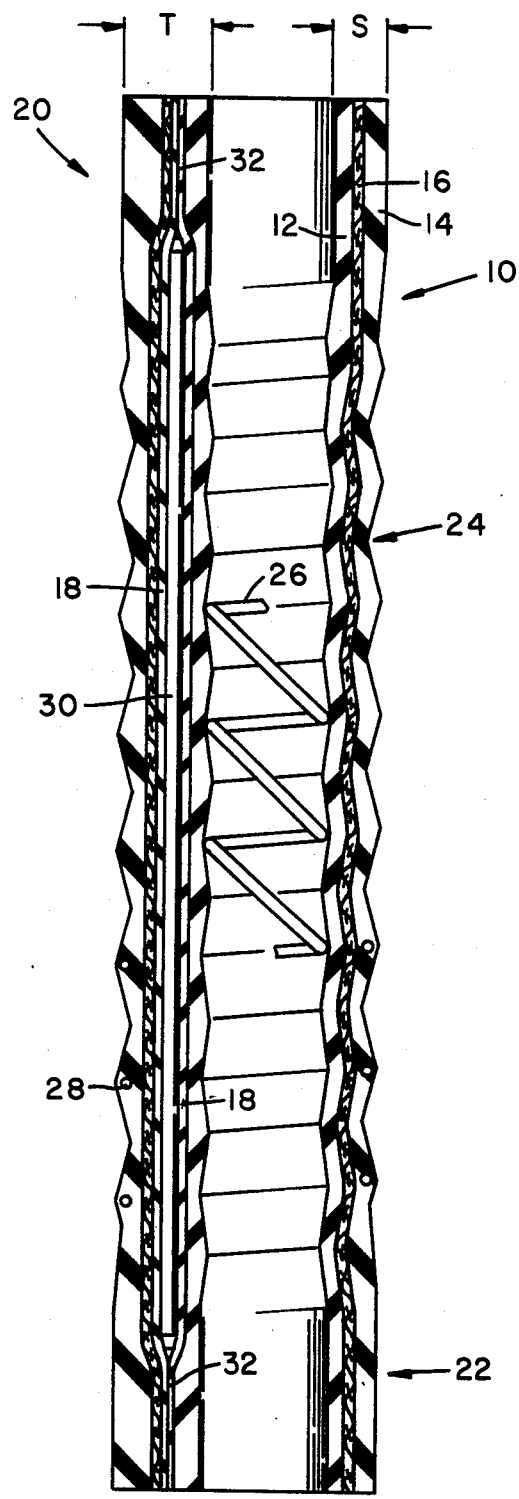
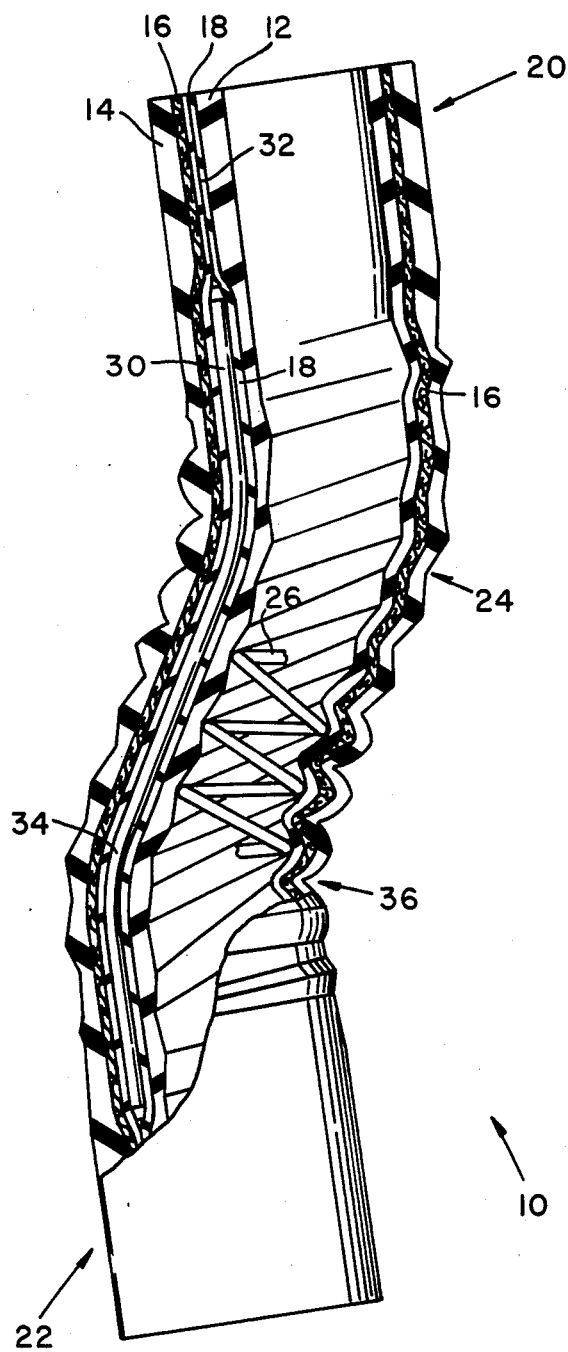
FIG. 1
FIG. 2

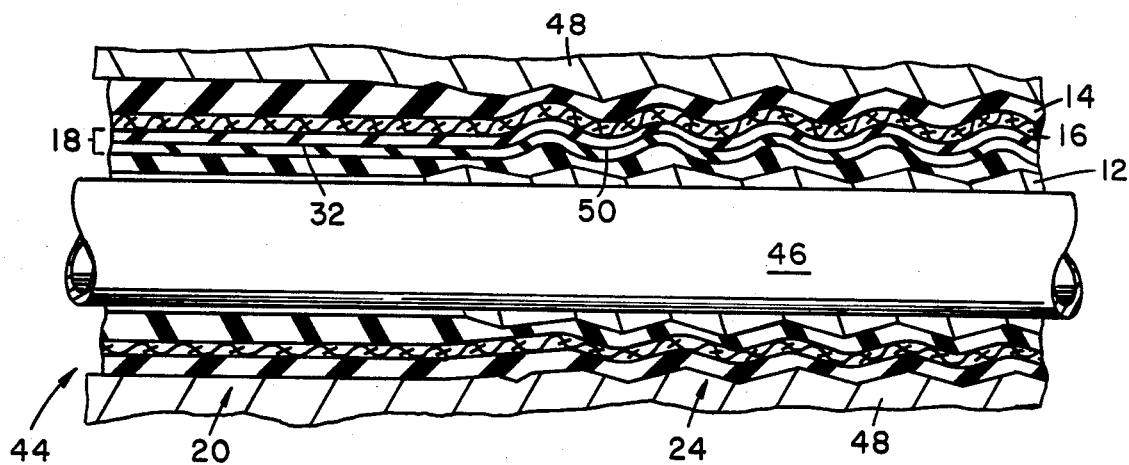
FIG. 9
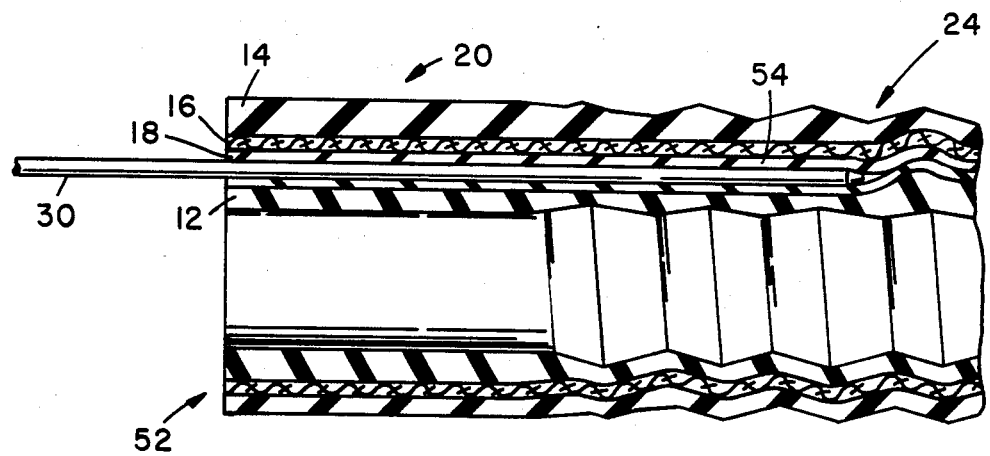
FIG. 10
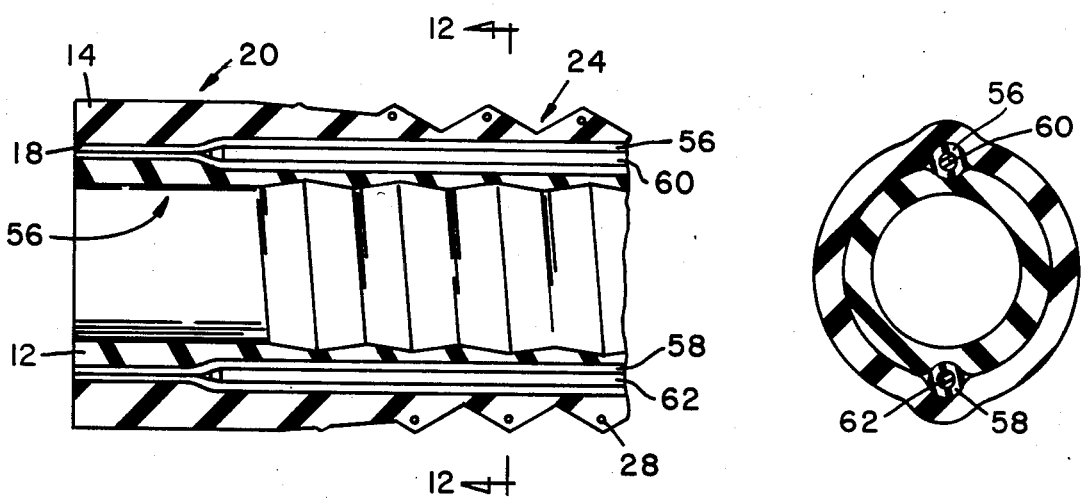
FIG. 11
FIG. 12

FORMABLE AND CURVE SHAPE RETENTIVE HOSE

BACKGROUND OF THE INVENTION

The invention relates to flexible polymeric hose of the elastomeric rubber or plastic type, but more particularly, the invention relates to flexible hose with means that facilitate bending and retaining the hose in a desired contour. The invention also relates to a method for making such hose without the need for extensive process or equipment changes.

Radiator hose is used extensively in automobiles for ducting a cooling fluid between an engine block and radiator. Some radiator hoses are molded with several compound curves to avoid interference with engine compartment components, such as V-belts, alternators, air pumps, brackets, or the like.

While curved or preformed hose solves routing and manufacturing assembly problems for an original equipment manufacturer, it creates inventory problems for an aftermarket hose distributor who finds it economically unfeasible to attempt to stock the required number of curved hose pieces for fitting all applications. Corrugated hose has become a popular replacement for curved hose to the small hose distributor because he can carry a small corrugated hose inventory that is suitable as a substitute for a variety of differently configured curved hoses. For example, one length of corrugated hose may be an effective substitute replacement for ten or more different curved hose configurations.

Corrugated hose has two sleeve or "cuff" ends that are interconnected by an intermediate corrugated sidewall that permits folding and inhibits kinking. An example of an early corrugated hose design appears in U.S. Pat. No. 314,440 to Eames. The Eames type hose is made on a mandrel and the corrugations are formed by helically wrapping a cord or rope around the hose to act as a mold for the corrugations.

Another type of hose is made by "pressure molding", which is achieved by internally pressurizing a hose and radially expanding it against a mold cavity of a desired configuration. An example of a corrugated hose made in such a manner is disclosed in U.S. Pat. No. 3,194,705 to Caplan. The Caplan hose also discloses an embodiment where a helical coil is embedded in the hose sidewall at either the corrugation's crests or valleys as a collapse resistance means when the hose is bent. Another type of hose that is radially expanded by pressure against the walls of a mold appears in U.S. Pat. No. 3,859,408 to Voss et al. Under the Voss et al method, a collapse resistance means may be inserted in the bore of the hose.

Although corrugated hose is an acceptable substitute for many curved hose applications, it has not been a "cure all" substitute for all curved hosed applications. Corrugated hose tends to take a symmetrical curved hose shape as its ends are positioned in parallel and/or angular misalignment from each other. For example, a hose may be shaped to a "S" bend, but both loops of the "S" tend to have the same bend radius. Many curved hose applications require unsymmetrical "S" bends to avoid interference with engine components. Various hose inserts have been developed for corrugated hose to solve the "S" bend problem. Examples of such corrugated hose with shape retentive inserts disposed in the hose bore appear in U.S. Pat. No. 4,327,775 to Tally and U.S. Pat. No. 4,456,034 to Bixby. While such hoses with internal inserts solve the hose "S" bend problem, they may introduce other problems in some hose applications. One problem is that the internal insert by design, defines an obstruction in the hose bore. Another problem is that the internal insert, being not fixably attached to the hose bore, may move during use and thereby permit an especially long hose to slump into an undesirable shape.

There are some hoses with reformable inserts in their sidewalls which avoid the obstruction problem as well as the slumping problem; however, such hoses have relatively small diameters and are made by extrusion processes that are not applicable to a corrugated sidewall construction or a pressure molding process. An example of a small diameter hose for use as automotive heater hose, which has a longitudinally oriented reinforcement in its sidewall appears in U.S. Pat. No. 4,463,779 to Wink et al. A hose with several longitudinally oriented elements disposed in its sidewall appears in U.S. Pat. No. 2,998,028 to Rohde. The Rohde construction cannot be used to make hose formed by the pressure molding process such as taught by Caplan or a cording process such as taught by Eames because under each of these process, pressure is applied to the hose sidewall during the curing. Pressure on the sidewall would collapse and seal the longitudinal wire receiving cavity during curing. The Wink et al hose construction is also inapplicable for making a hose with a corrugated sidewall. A longitudinal cavity formed in the hose sidewall would be collapsed and sealed as the sidewall is pressurized to take a corrugated shape. A wire coextruded with the Wink et al hose would prevent or substantially inhibit a sidewall to be formed into a corrugated shape under either the Caplan or Eames methods of forming a hose sidewall.

SUMMARY OF THE INVENTION

In accordance with the invention, a formable, shape retentive hose is provided that may have either a cylindrical, or more preferably, a corrugated sidewall. Shape retentiveness is provided by a longitudinally oriented, reformable rod that is disposed in an elastomeric tube located in the sidewall of the hose.

Under the method of the invention, a precured tube is placed in the sidewall of an uncured hose after which the hose sidewall is pressurized and cured. A reformable rod is then inserted into the unsealed, precured tube.

An advantage of the invention is that a shape retentive, corrugated hose may be made by a hose molding process without any mold changes for locating a reformable rod in the hose sidewall.

This and other advantages or objects of the invention will be apparent after reviewing the drawings and description thereof, wherein:

FIG. 1 is a view in partial cross-section along the longitudinal axis of a helically corrugated type hose with a reformable rod located in a hose sidewall;

FIG. 2 is a partially cutaway view along the longitudinal axis of a corrugated hose like that illustrated in FIG. 1 but showing the hose and its reformable rod in a shape retentive, curved position;

FIG. 9 is a partial cross-sectional view of hose having construction features as illustrated by FIG. 3 and as located in a corrugated mold;

FIG. 10 is a cross-sectional view of the hose as illustrated in FIG. 9, and showing the placement of a reformable rod in the hose sidewall;

FIG. 11 is a cross-sectional view of a hose similar to that as illustrated by FIG. 10, but showing an alternate construction feature of the invention.

FIG. 12 is a cross-sectional view taken along the line 12—12 of FIG. 11.

DESCRIPTION OF PREFERRED EMBODIMENTS

Article

Figure 3:
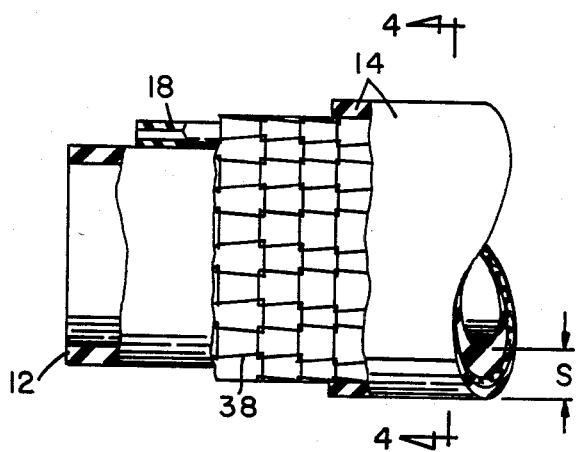
FIG. 3 is a partially cutaway side view exposing construction features of a hose of the invention.

Primarily referring to FIGS. 1 and 2, a hose of the invention has a tube 12, a cover 14, and a reinforcement 16 that together characterize a sidewall S of the hose. The tube and cover may be made from any suitable elastomer, which may be of the thermosetting or thermoplastic type such as plastic, polyurethane, thermoplastic rubber, thermosetting rubber or blends thereof or the like that are cured into a desired configuration with an application of heat. In the case of thermoplastics, a heating followed by a cooling is required to retain a desired shape, whereas, in the case of thermosetting elastomers, only heating is required. The reinforcement 16 may also be of any suitable type, such as a twined reinforcement in the form of a knit, braid, spiral, fabric discontinuous fibers or the like, and may be made of any suitable material, such as natural or synthetic fibers.

At least one precured elastomeric tube is located in the sidewall S, and is longitudinally oriented with the hose. The precured tube may be extruded and of any suitable thermosetting or thermoplastic elastomeric material, such as those listed above for the tube and cover. Should a thermoplastic material be selected for the precured tube, its melt temperature must be greater than the cure temperature for the hose tube 12 or cover 14, whether they be of thermosetting or thermoplastic materials. A thermosetting tube is cured in its extruded shape. That portion of the sidewall containing the precured tube 18 may be of a greater thickness T than other portions of the hose sidewall.

For a hose of the corrugated type, the hose sidewall is formed into cuff ends 20, 22 and an intermediate corrugated sidewall 24 that may be in the form of a helix or successive annular peaks and valleys. The cuff ends permit clamping and sealing against a nipple, such as a radiator boss. While the corrugated sidewall permits folding and stretching when the hose is bent, a helical spring 26 is preferably located in the bore of the hose as a means for inhibiting kinking when the hose is bent. Optionally, a helical spring 28 may be located in the hose sidewall for the same purpose.

A reformable rod 30, such as made of wire, is disposed in the precured tube preferably in the corrugated wall portion intermediate the cuff ends. The reformable rod may spread or straighten that portion of the precured tube and the corrugated sidewall portion and leave the precured tube partially flattened 32 in the cuff portions. It is preferred that the reformable rod does not extend into that portion of a cuff end that will be clamped, because if there, it could prevent making an effective seal between the hose and a nipple as the hose is clamped.

When the hose is bent, the reformable rod may move slightly in the tube as it also bends 34 to retain the hose in a curved configuration 36.

Figure 4:
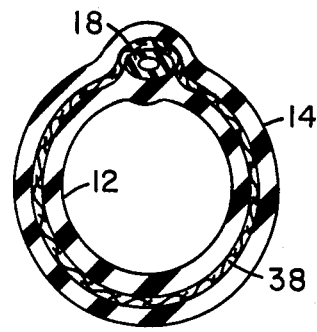
FIG. 4 is a cross-sectional view taken along the line 4—4 of FIG. 3.

Referring to FIGS. 3–8, the precured tube 18 may be located at various positions within the hose sidewall. For ease of manufacturing, a most preferred location is illustrated by FIGS. 3 and 4 where the precured tube 18 is positioned against the hose tube 12 and a fibrous reinforcement 16, such as a knit 38, surrounds the precured tube and hose tube. The cover 14 is then formed over the fibrous reinforcement. The fibrous reinforcement not only reinforces the hose tube, but it also helps retain the precured tube 18 within the sidewall when the reformable rod is bent.

Figure 5:
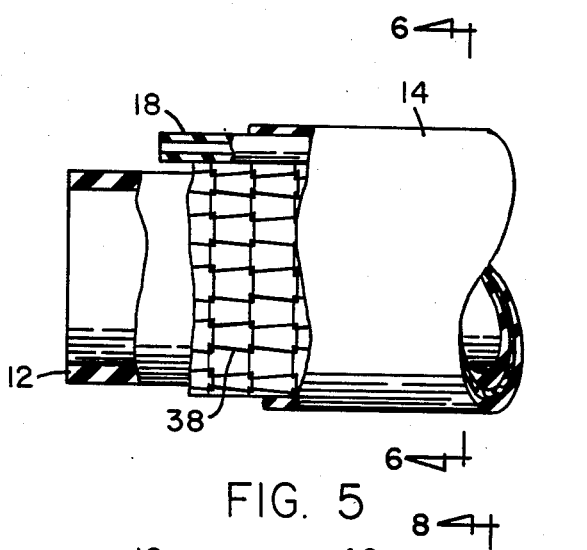
FIG. 5 is a view similar to FIG. 3, but showing alternate construction features of a hose of the invention.
Figure 6:
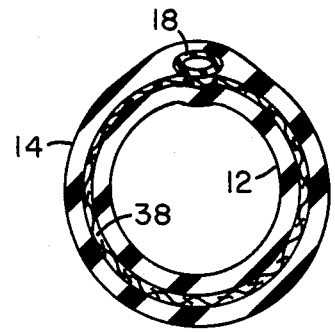
FIG. 6 is a cross-sectional view taken along the line 6—6 of FIG. 5.

As illustrated by FIGS. 5 and 6, the fibrous reinforcement knit 38 may surround the hose tube 12 so that the precured tube 18 is positioned over the fibrous reinforcement. A cover is formed and shaped around the precured tube and fibrous reinforcement. The tube and cover may be preformed in any acceptable manner such as by extruding or wrapping.

Figure 7:
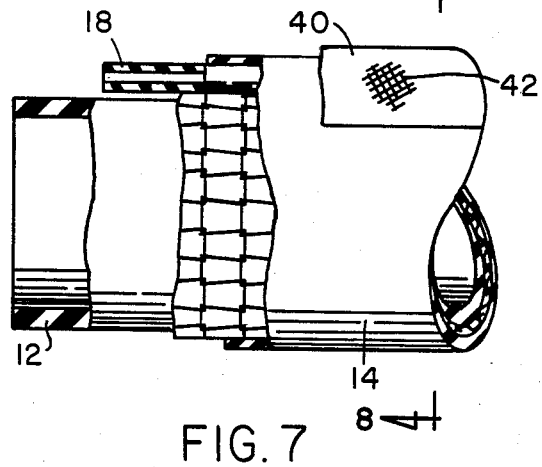
FIG. 7 is a view similar to FIG. 3, but showing alternate construction features of a hose of the invention.
Figure 8:
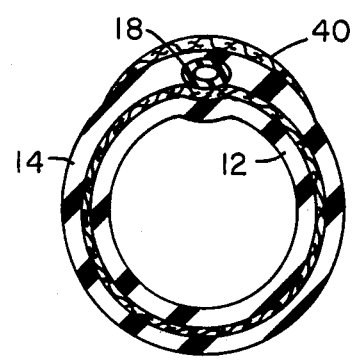
FIG. 8 is a cross-sectional view taken along the line 8—8 of FIG. 7.

FIGS. 7 and 8 illustrate a construction similar to that of FIGS. 5 and 6, except that a strip 40 of fibrous reinforcement, such as rubberized bias woven fabric 42 is positioned over the precured tube to act as a reinforcement to hold the precured tube and reformable wire to the hose when it is bent.

Method

A primary advantage of the invention is reflected by a method which does not require extensive changes to hose making equipment. Referring to FIG. 9, an uncured hose 44 with a precured tube 18 located in its sidewall, and having the construction illustrated by FIGS. 3 and 4, is positioned over a loose fitting support mandrel 46 and placed into a mold 48 with a cavity shaped for a corrugated hose, such as that taught by Caplan. The bore of the hose is pressurized, which positions the hose against the mold while shaping it to form cuff ends 20 and a corrugated sidewall 24. In the case of rubber being used for the precured tube, hose and cover, heat is applied for the requisite time, and the hose is cured. The precured tube may be partially flattened 32 and kinked 50 in the corrugated hose sidewall during the time that the hose sidewall is pressurized and formed against the mold. While the precured tube may partially flatten during the time that the hose is pressure molded into a desired shape, the bore of the precured hose does not seal against itself because it has been precured. Note that the mold and mandrel do not require any special machining to accommodate the thicker sidewall portion containing the precured tube. Accordingly, known and unmodified hose molding equipment is used.

Several pieces of hose may be cured in "end to end" fashion as is known in the art. After curing, the hoses are cut 52 to their appropriate length. As illustrated by FIG. 10, a reformable rod 30 is then inserted into the precured tube 18, which partially spreads and straightens that portion 54 of the precured tube where the rod is located.

As shown in FIG. 11, the reformable rod 18 is positioned in the sidewall juxtaposed the corrugated wall portions, leaving that portion 56 of the precured tube in the cuff ends free of the reformable rod. Two or more precured tubes 56,58 with a reformable rods 60,62 disposed therein may be required for large diameter hose (i.e., 2 inches in diameter or greater).

The forgoing detailed description is made for the purpose of illustration only and is not intended to limit the scope of the invention, which is to be determined from the appended claims.

What is claimed is:

1. In a formable hose of the cured elastomeric type having a tube, a cover and a reinforcement that together characterize a sidewall of the hose, the improvement comprising:
   at least one precured elastomeric tube located in the sidewall and longitudinally oriented with the hose; and
   a reformable rod disposed in the precured elastomeric tube.

2. The formable hose as claimed in claim 1, of which the sidewall successively comprises the tube, a fibrous reinforcement and the cover, and wherein the precured elastomeric tube is located between the tube and fibrous reinforcement.

3. The formable hose as claimed in claim 2, which further includes a helical wire means for inhibiting kinking when the hose is bent.

4. The formable hose as claimed in claim 1 of which the sidewall successively comprises the tube, a fibrous reinforcement and the cover and wherein the precured elastomeric tube is located between the fibrous reinforcement and cover.

5. The formable hose as claimed in claim 4, which further includes a helical wire means for inhibiting kinking when the hose is bent.

6. The formable hose as claimed in claim 1, of which the sidewall successively comprises the tube, a fibrous reinforcement, the cover and a strip of fibrous reinforcement longitudinally oriented with the hose, and wherein the precured tube is located between the cover and strip of fibrous reinforcement.

7. The formable hose as claimed in claim 6, which further includes a helical wire means for inhibiting kinking when the hose is bent.

8. The formable hose as claimed in claim 1, of which the sidewall successively comprises the tube, a fibrous reinforcement and cover, and wherein the sidewall is corrugated intermediate cuff ends of the hose and the reformable rod extends substantially between the cuff ends.

9. A hose as claimed in claim 8 wherein the precured tube extends an entire length of the cured hose, and is partially flattened at each cuff end, and is partially spread apart and straightened juxtaposed the reformable rod and corrugated sidewall.

10. The formable hose as claimed in claim 8 wherein the precured tube is located between the tube and fibrous reinforcement, and the hose further includes a helical wire means for inhibiting kinking when the hose is bent.

11. The formable hose as claimed in claim 9 wherein the helical wire is located in the hose sidewall.

12. The formable hose as claimed in claim 9 wherein the helical wire is located in a bore of the hose.

13. In a formable, shape retentive hose of the cured elastomeric type with a tube having a bore, a reinforcement and a cover, which together characterize a sidewall of a hose that is corrugated between cuff ends, the improvement comprising:
   at least one precured tube located in the sidewall and longitudinally oriented and extending an entire length of the hose;
   a reformable rod disposed and free to slide in the precured elastomeric tube intermediate the cuff ends; and
   a helical wire means for inhibiting kinking when the hose is bent.

14. The formable hose as claimed in claim 12, of which the sidewall successively comprises the tube, a fibrous reinforcement and the cover, and wherein the precured elastomeric tube is located between the tube and fibrous reinforcement.

15. The formable hose as claimed in claim 13 wherein the helical wire means is located in the hose bore.

16. The formable hose as claimed in claim 12 wherein the hose sidewall is thicker juxtaposed the precured elastomeric tube.

17. The formable hose as claimed in claim 12 wherein there are at least two longitudinally oriented precured tubes located in the sidewall and a reformable rod is disposed in each precured tube.

18. The hose as claimed in claim 12 wherein the hose with the precured tube in the sidewall is pressure cured in a mold and after which the reformable rod is inserted in the precured tube.

19. The hose as claimed in claim 17 wherein the precured hose follows a corrugated path in the sidewall after the hose is cured and a substantially straighter path after the rod is inserted in the precured tube.

* * * * *